(12) United States Patent
Olson et al.

(10) Patent No.: US 10,413,027 B1
(45) Date of Patent: Sep. 17, 2019

(54) MOBILE COMMUNICATION DEVICE CASE

(71) Applicants: Tristin L Olson, Eudora, KS (US);
Jerry Olson, Eudora, KS (US)

(72) Inventors: Tristin L Olson, Eudora, KS (US);
Jerry Olson, Eudora, KS (US)

( * ) Notice: Subject to any disclaimer, the term of this patent is extended or adjusted under 35 U.S.C. 154(b) by 0 days.

(21) Appl. No.: 16/366,397

(22) Filed: Mar. 27, 2019

(51) Int. Cl.
*A45C 11/00* (2006.01)
*F16M 11/06* (2006.01)

(52) U.S. Cl.
CPC .............. *A45C 11/00* (2013.01); *F16M 11/06* (2013.01); *A45C 2011/002* (2013.01)

(58) Field of Classification Search
CPC ....... A45C 11/00; A45C 13/004; A45C 13/02; A45C 13/025; A45C 2011/002; A45C 2011/003; A45C 2200/15; F16M 11/00; F16M 11/04; F16M 11/041; F16M 11/10; F16M 11/105; F16M 11/38; F16M 13/00; F16M 13/005; F16M 13/02; F16M 13/04; F16M 2200/024; F16M 2200/08; H04M 1/0214; H04M 1/04; H04M 1/11; H04M 1/12
See application file for complete search history.

(56) References Cited

U.S. PATENT DOCUMENTS

| | | | | |
|---|---|---|---|---|
| 6,971,622 B2 * | 12/2005 | Ziegler | .................. | F16M 11/10 248/454 |
| 9,220,327 B2 * | 12/2015 | Hsu | ........................ | A45C 11/00 |
| 9,755,688 B1 * | 9/2017 | McKenzie | ........... | H04B 1/3888 |
| 9,788,621 B2 | 10/2017 | Kim | | |
| 9,866,663 B2 | 1/2018 | Kim | | |
| 9,912,368 B2 | 3/2018 | Kim | | |
| 2009/0036174 A1 * | 2/2009 | Brandenburg | ....... | H04B 1/3888 455/575.1 |
| 2010/0051775 A1 * | 3/2010 | Wu | ........................ | F16M 11/10 248/371 |
| 2010/0072334 A1 * | 3/2010 | Le Gette | ................ | F16M 13/00 248/176.3 |
| 2010/0308202 A1 * | 12/2010 | Hu | ........................ | F16M 11/041 248/685 |
| 2013/0277237 A1 * | 10/2013 | Wang | ..................... | A45C 11/00 206/45.2 |
| 2014/0124521 A1 * | 5/2014 | Brown | .................... | H05K 5/023 220/756 |
| 2014/0262854 A1 * | 9/2014 | Chen | ...................... | A45C 11/00 206/45.24 |
| 2014/0332418 A1 * | 11/2014 | Cheung | .................. | F16M 11/10 206/45.2 |

* cited by examiner

*Primary Examiner* — Corey N Skurdal
(74) *Attorney, Agent, or Firm* — Dale J. Ream

(57) ABSTRACT

A case for supporting a communication device includes a casing defining an interior space for protecting a communication device therein, a back portion defining an interior area beneath the outer surface. The back portion defines a first channel in communication with the interior area and extends between side edges of the back panel, a pair of first grooves in communication with the first channel, and a pair of second grooves in communication with the pair of first grooves. The case includes a pair of first leg assemblies, each including a first leg portion slidably received into the first channel, a second leg portion coupled to the first leg portion and removably received in the first groove, and a third leg portion coupled to the second portion and removably received in the second groove. Each second leg portion is pivotally coupled to a respective first leg portion with a ball joint.

20 Claims, 9 Drawing Sheets

MOBILE COMMUNICATION DEVICE CASE

BACKGROUND OF THE INVENTION

This invention relates generally to cases for housing electronic devices and, more particularly, to a mobile communications device case in which a back wall defines a channel having multiple grooves in which a pair of leg assemblies are nested, the leg assemblies being length and position adjustable and having grip members by which to mount the case for ease of use while operating an automobile.

Many state and federal jurisdictions have laws limiting or prohibiting cell phone use while operating an automobile. At the very least, there is an increased awareness that use of electronic devices while driving amounts to "distracted driving" and is dangerous. In addition, mobile communication devices, e.g. "smart phones" have become quite sophisticated and are often used for watching entire movies. As a result, users often attempt to prop up the smart device so as not to hold it the whole time. Although various devices have been proposed for propping up a mobile communications device and are presumably effective for their intended uses, the existing proposed solutions are still less effective at being used in an automobile and, specifically, for gripping a structure such as the flaps of vent.

Therefore, it would be desirable to have a case for protecting a mobile communications device that includes a back panel defining an interior area and interconnected grooves for holding a pair of leg assemblies, each leg assembly having multiple leg portions adjustable rearwardly and laterally. Further, it would be desirable to have a case having leg assemblies that are telescopically extensible and include foot portions that grip external structures, such as ventilation structures in an automobile.

SUMMARY OF THE INVENTION

A case for supporting a mobile communication device according to the present invention includes a casing having a plurality of walls arranged to define an interior space for protecting the mobile communication device positioned inside the interior space, wherein one of the plurality of walls is a back portion having an outer surface and defining an interior area beneath the outer surface. The back portion defines a first channel in communication with the interior area and extending between opposed side edges of the back panel, a pair of first grooves in communication with the first channel, and a pair of second grooves in communication with the pair of first grooves, respectively.

The case includes a pair of first leg assemblies, each first leg assembly including a first leg portion slidably received into opposed ends of the first channel, respectively, and a second leg portion coupled to the first leg portion and removably received in the first groove, and a third leg portion coupled to the second portion and removably received in the second groove. Each respective second leg portion is pivotally coupled to a respective first leg portion with a ball joint for operable movement of the respective second leg portion relative to the respective first leg portion.

Therefore, a general object of this invention is to provide a case having an interior space for housing a mobile communications device (e.g. a cell phone communications module) and a pair of leg assemblies that are telescopically extensible from a back of the case for supporting the case.

Another object of this invention is to provide a case for a mobile communications device, as aforesaid, in which each leg assembly includes two or more adjustable leg portions such that the leg assembly extends both laterally and rearwardly from a back panel of the housing.

Still another object of this invention is to provide a case, as aforesaid, having a back panel that defines an interior areas configured to nest each leg assembly when not extended.

Yet another object of this invention is to provide a case, as aforesaid, in which each leg assembly includes an inwardly directed portion suitable for capturing a structure of an air vent of a vehicle such that the housing may be releasably coupled to the air vent while driving the vehicle.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
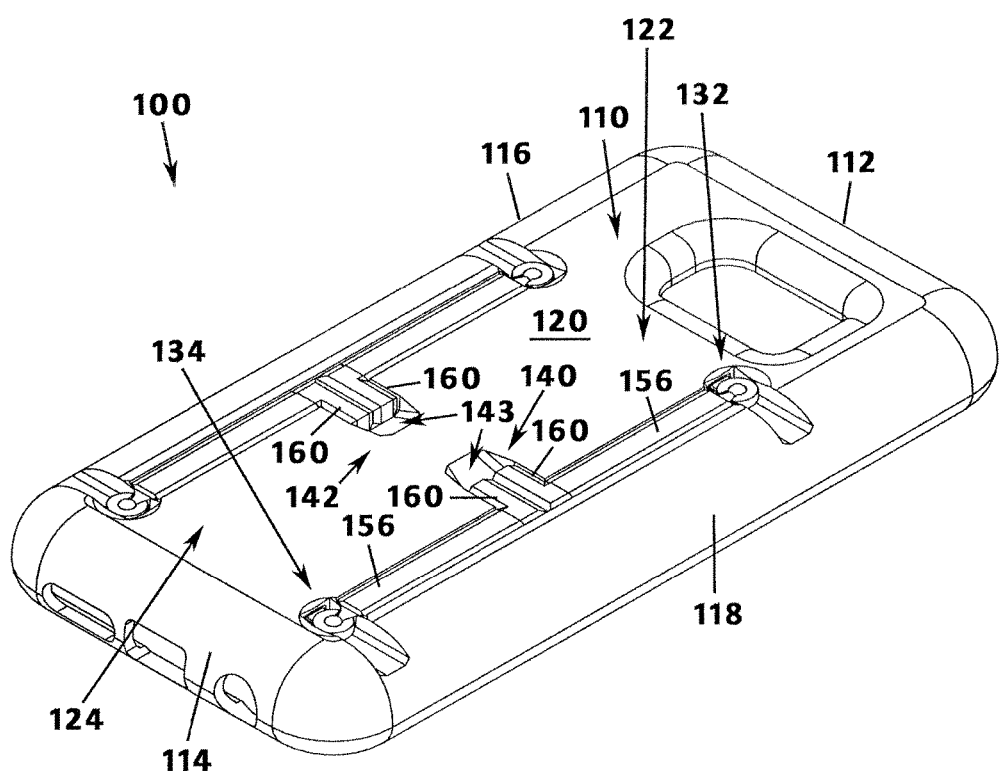
FIG. 1 is a perspective view of a back side of a mobile communications device case according to a preferred embodiment of the present invention, illustrated in a stowed configuration.

A case 100 for supporting a mobile communication device according to a preferred embodiment of the present invention will now be described in detail with reference to FIGS. 1 to 9 of the accompanying drawings.

Generally, the case 100 includes a back panel 110, and a plurality of walls 112, 114, 116, and 118 extending from the back panel 110 and arranged to define an interior space for receiving a mobile communication device. The back panel 110 has an outer surface 120 and an interior area 130 (FIG. 9) defined below the outer surface 120.

Figure 9:
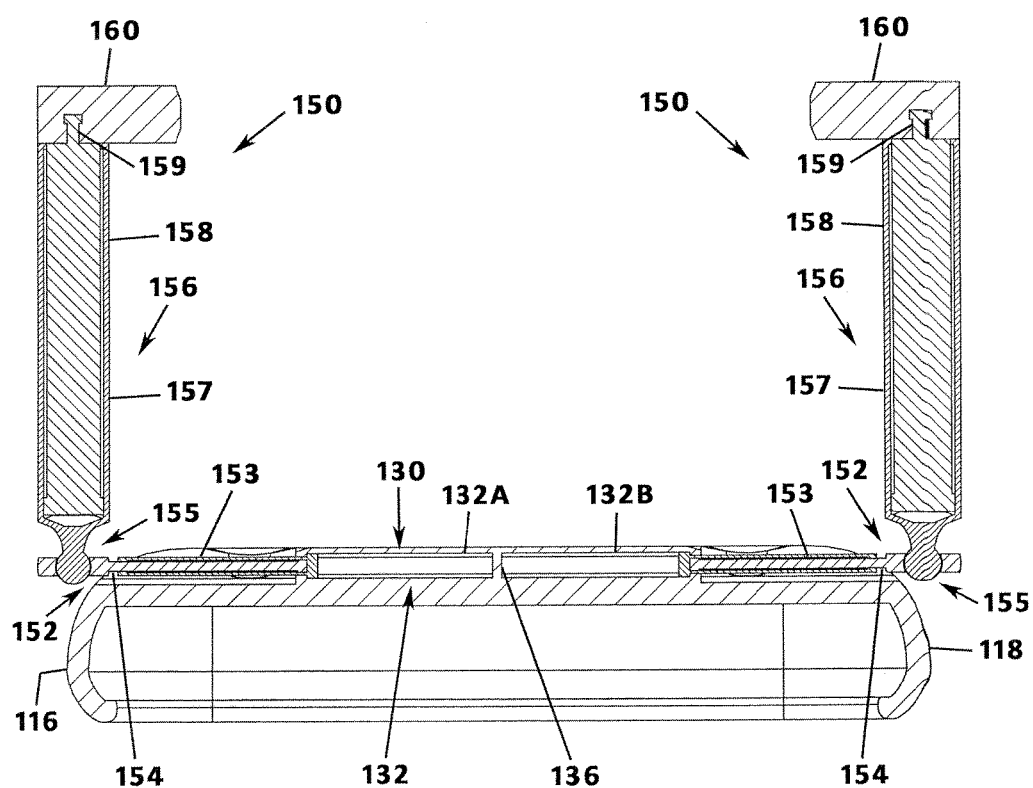
FIG. 9 is a sectional view taken along line 9-9 of FIG. 8.

The interior area 130 includes a first channel 132 that extends between opposing sides 112 and 116. In one embodiment, the channel 132 is continuous. In another embodiment, as seen in FIG. 9, the channel 132 is broken into a first channel portion 132A and a second channel portion 132B separated by a wall 136. The channel 132 may be located near a top end 122 of the back panel 120. Optionally, a second channel 134 extends between opposing sides 112 and 116, and may be located near a bottom end 124 of the back panel 110. The second channel 134 may also be broken into a first channel portion and a second channel portion, which may be separated by a wall.

A first groove 137 extends longitudinally along at least a portion of the length of the back panel 110 at a first side 126 thereof. In an embodiment, the groove 137 extends along the length of the back panel 110 between the first and second channels 132 and 134. The first groove 137 may be inwardly offset from an open groove end 133A of the first channel 132. Where the case 100 includes a second channel 134, the first groove 137 is inwardly offset from the first open groove end 133A and an open groove ends 135A of the second channel 134. In embodiments, a second groove 138 extends longitudinally along at least a portion of the length of the back panel 110 at a second side 128. In an embodiment, the groove 138 extends along the length of the back panel 110 between the first and second channels 132 and 134. The second groove 138 may be inwardly offset from open groove end 133B, or open groove ends 133B and 135B where the case 100 includes channels 132 and 134.

A first recessed access point 140 may be defined in the back panel outer surface 120, and may extend perpendicularly from the first groove 137 toward the center of the back panel 110. Likewise, a second recessed access point 142 may be defined in the back panel outer surface 120 and may extend perpendicularly from the second groove 138 in the direction of the center of the back panel 110. Each of the recessed access points 140, 142 may include an angled wall 144, 146 for engaging with respective leg assemblies 150A, 150B, 150C, and 150D (generally, 150) as described in greater detail below.

Figure 2:
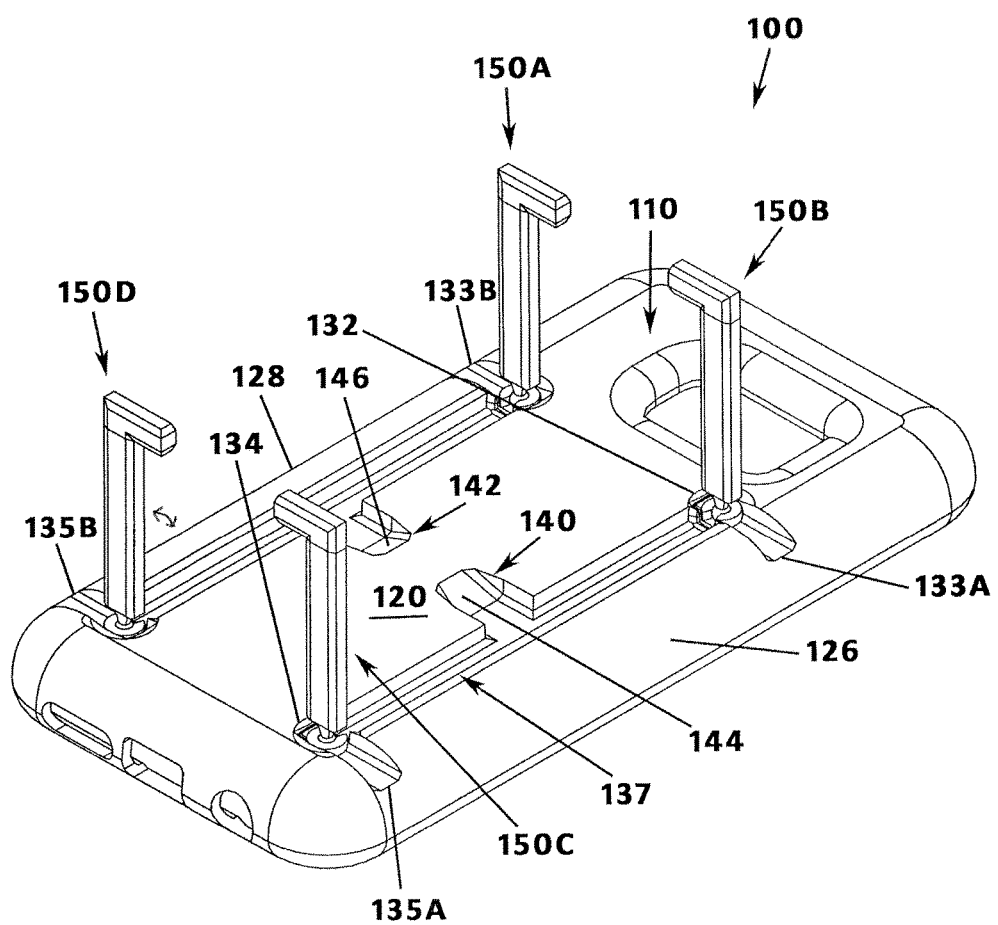
FIG. 2 is another perspective view of the case as in FIG. 1, illustrated in a partially deployed configuration.

Each leg assembly 150 includes a first leg portion 152 secured to a second leg portion 156 at a pivotal linkage 155, such as a ball joint or the like. The first leg portion 152 is slidably received into a respective channel 132 or 134 (or channel portion 132A, 132B, 134A, or 134B). In embodiments, the first leg portion 152 includes a proximal portion 153 in telescopic communication with a distal portion 154. The first leg portion 152 is reconfigurable between a retracted configuration and a deployed configuration. In the retracted configuration, the first leg portion 152 is stored substantially within the respective channel 132 or 134 as illustrated in FIGS. 1 and 2, and is therefore almost entirely concealed inside the case 100.

Figure 3:
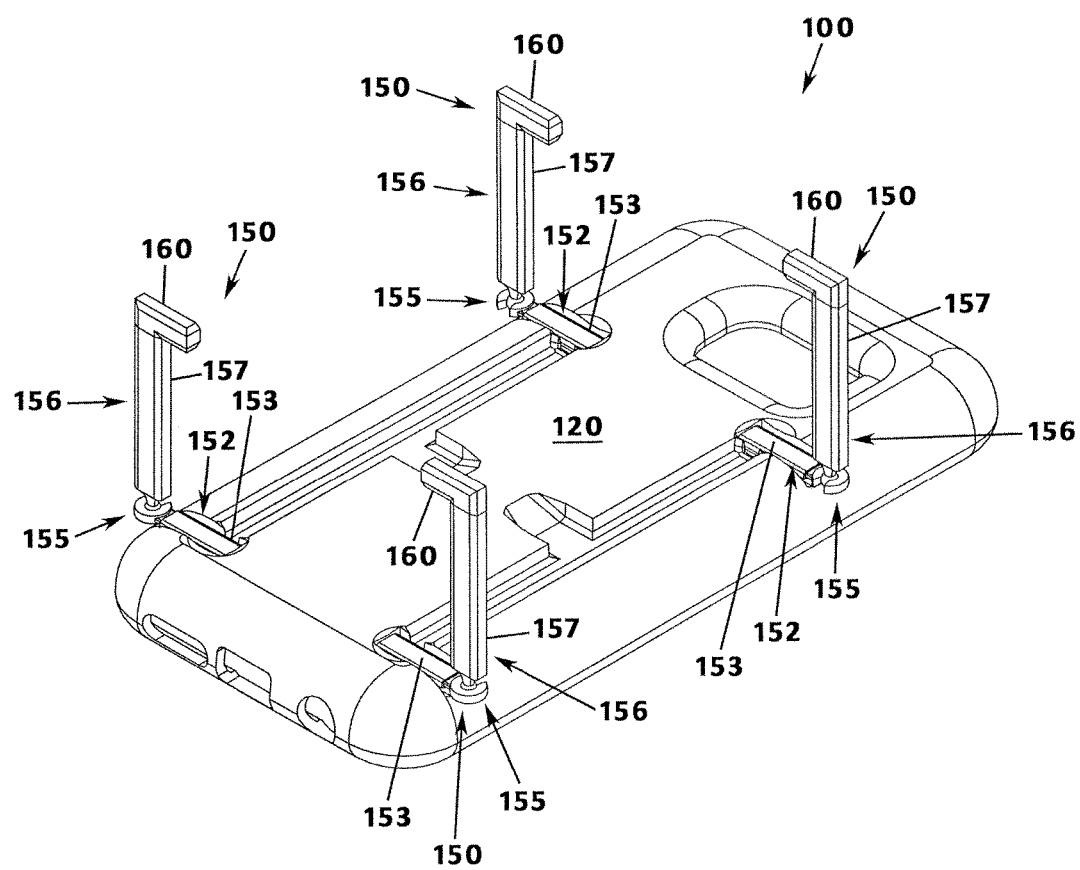
FIG. 3 is another perspective view of the case as in FIG. 1, illustrated in a further partially deployed configuration.
Figure 4:
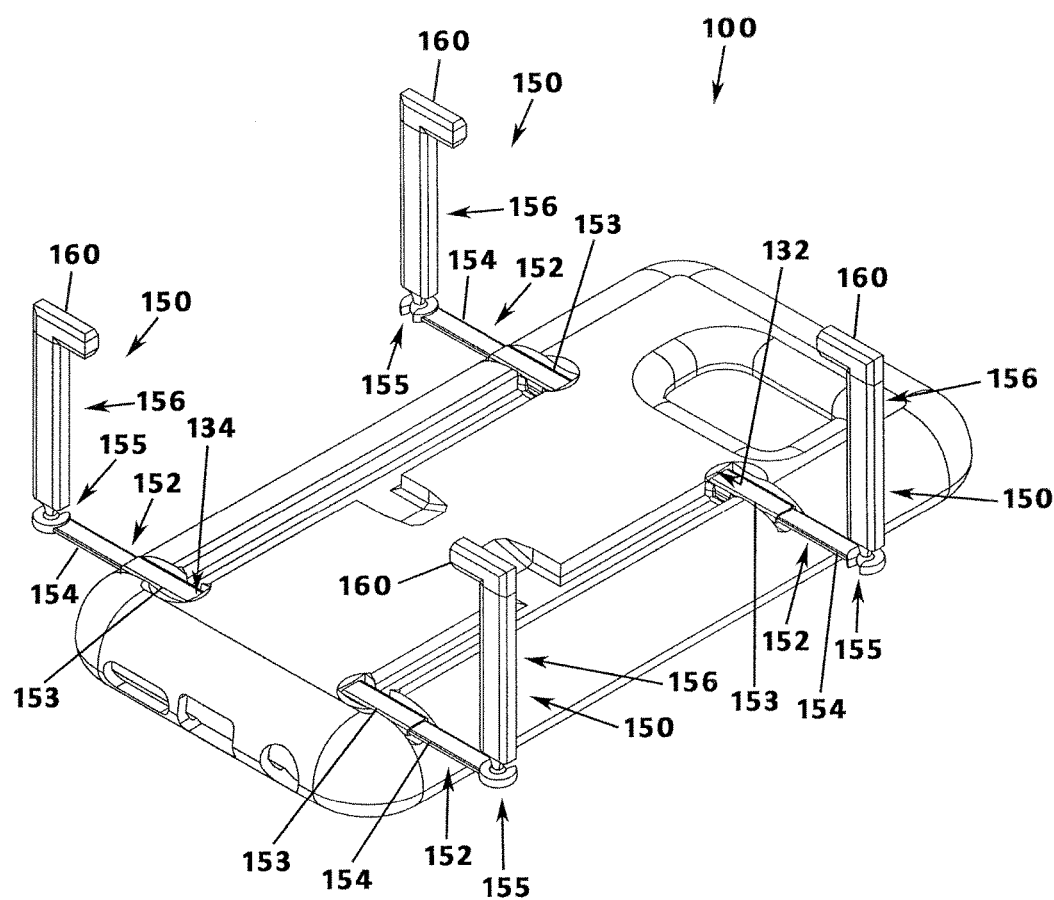
FIG. 4 is another perspective view of the case as in FIG. 1, illustrated in a further partially deployed configuration.
Figure 6:
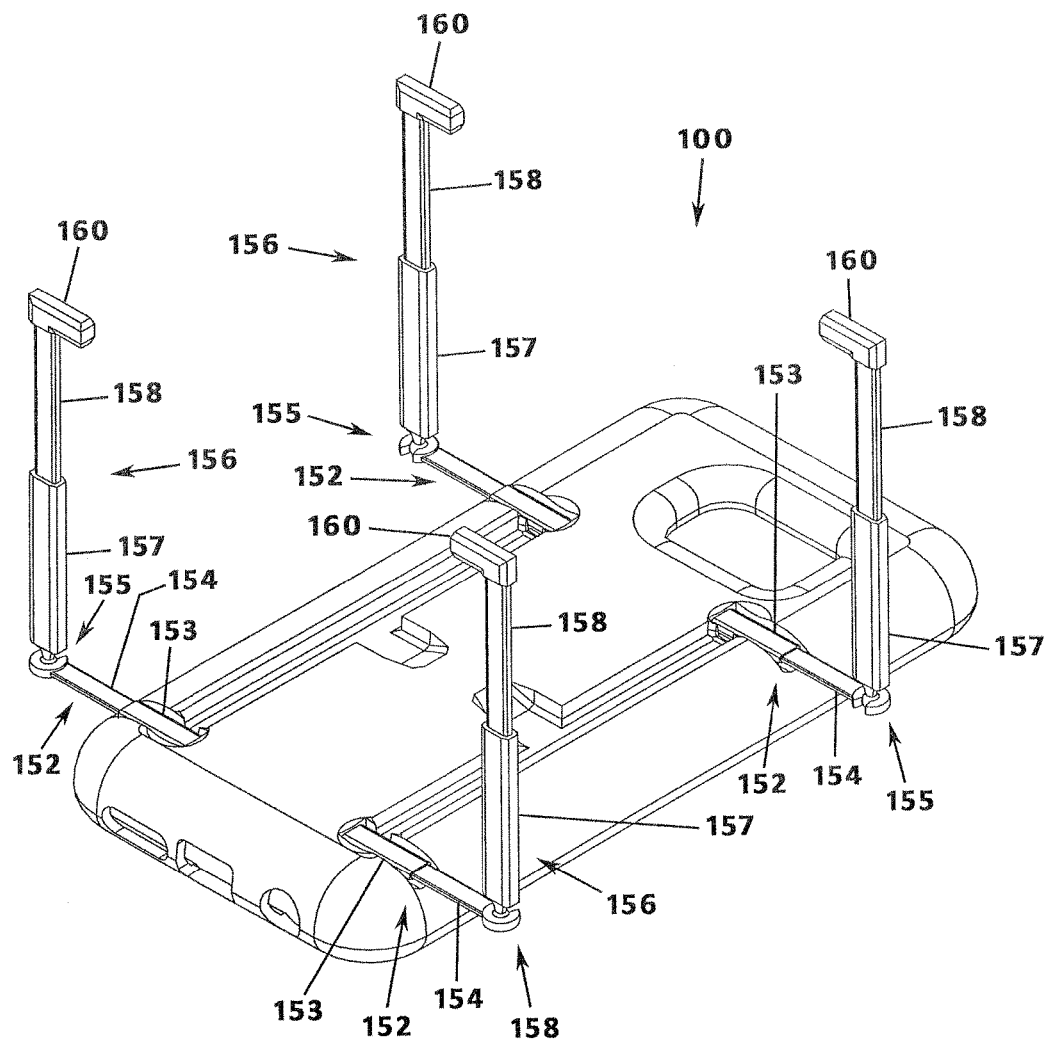
FIG. 6 is another perspective view of the case as in FIG. 1, illustrated in a further deployed configuration.
Figure 7:
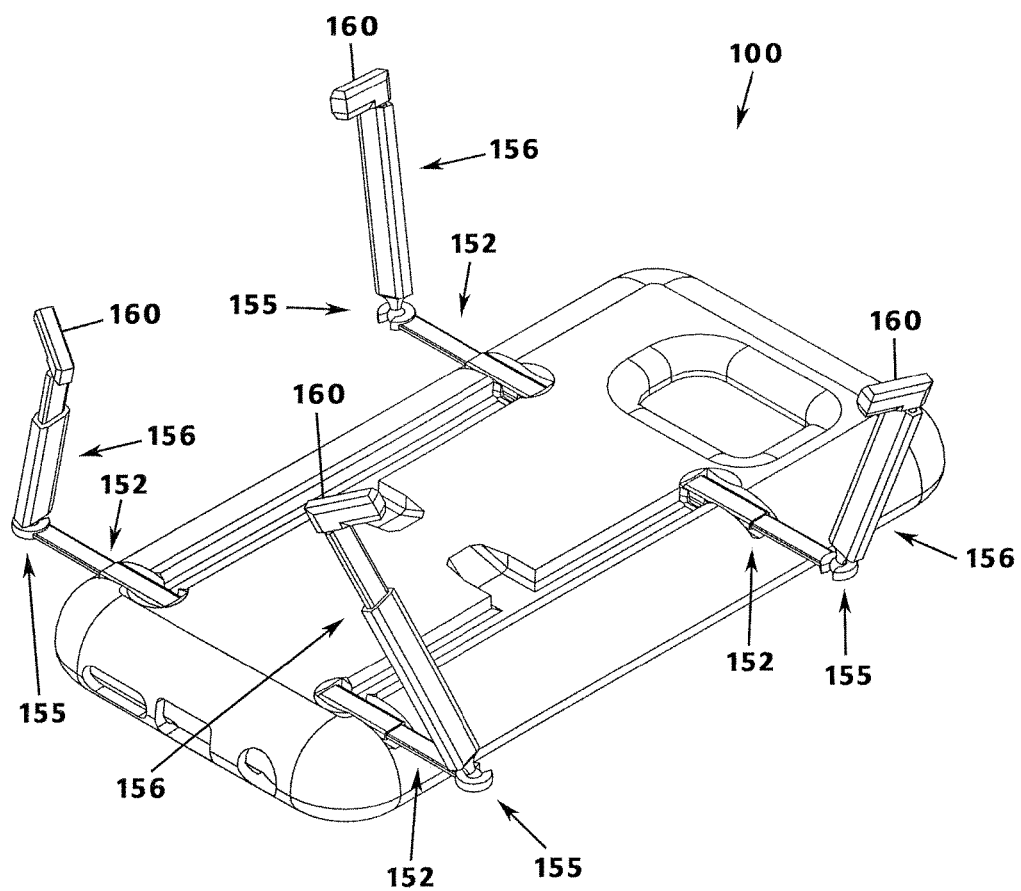
FIG. 7 is another perspective view of the case as in FIG. 1, illustrated in a further deployed configuration.
Figure 8:
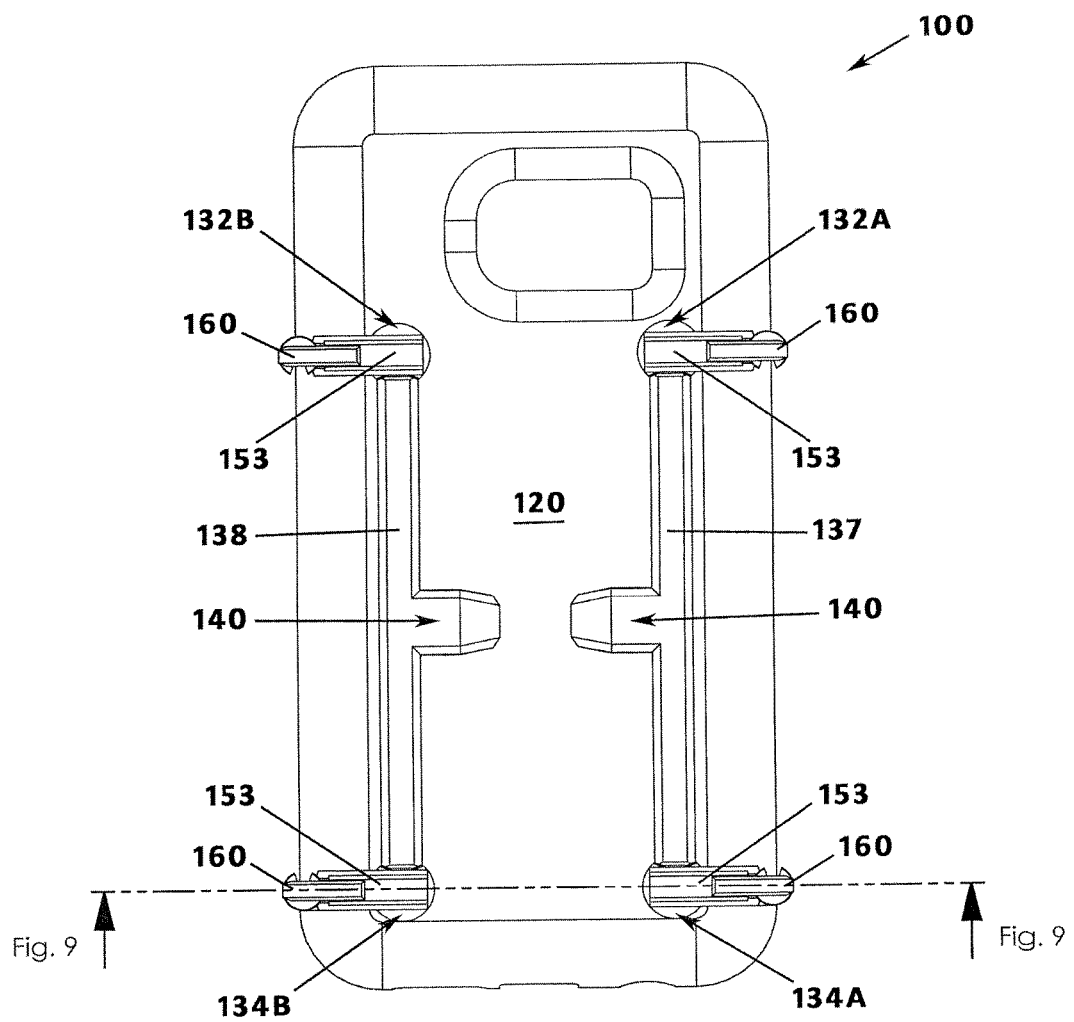
FIG. 8 is a two-dimensional view of the case as in FIG. 1.

The first leg portion 152 can be selectively partially or fully deployed. In a partially deployed configuration, the proximal portion 153 is withdrawn from within the respective channel 132 or 134 as shown in FIGS. 3 and 8. In the fully deployed configuration, the distal portion 154 is further withdrawn from the proximal portion 152, as shown in FIGS. 4-7. In the fully deployed configuration, the legs 150 may provide further stability as compared to the partially deployed configuration.

Similarly, the second leg portion 156 includes a proximal portion 157 in telescopic communication with a distal portion 158. The second leg portion 156 is selectively reconfigurable between a retracted configuration and an extended configuration. In the retracted configuration, the distal portion 158 is telescopically received into the proximal portion 157, as shown in FIG. 2. In the extended configuration, the distal portion 158 is withdrawn from within the proximal portion 157, as illustrated in FIG. 6.

Figure 5:
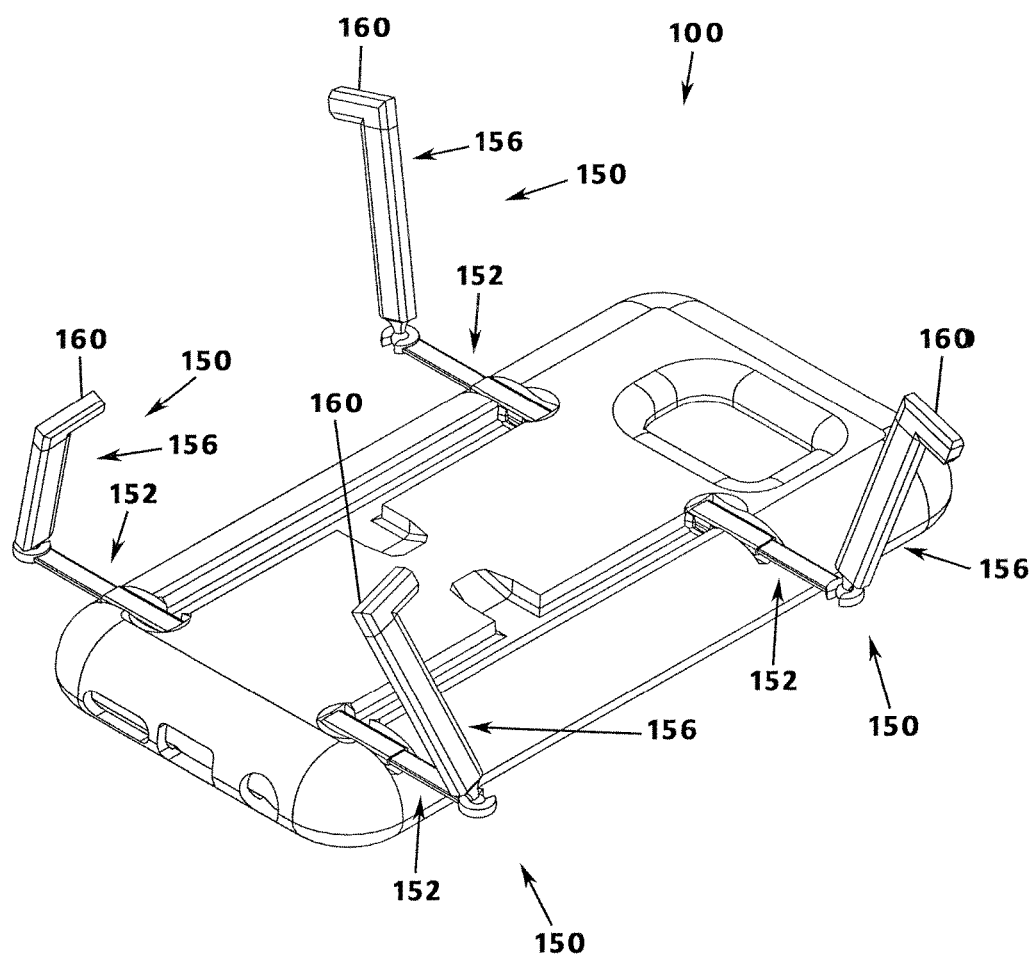
FIG. 5 is another perspective view of the case as in FIG. 1, illustrated in a further deployed configuration.

The pivotal linkage 155 allows the second leg portion 156 to pivot relative to the first leg portion 152 when in use. The second leg portion 156 may be adjusted to a desired angle to stabilize the case 100 as required by the user. For example, the second leg portion 156 may be angled in towards the outer surface 120 of the back panel 110, or away from the outer surface 120 of the back panel 110. Further, the second leg portion 156 may be angled towards the top end 122 of the case 100, or the bottom end 124 of the case 100. Several exemplary angled arrangements of the second leg portion 156 are illustrated in FIG. 5, although other arrangements are also possible. Each leg 150 may be selectively pivoted into a particular position as desired.

In embodiments, the linkage 155 is friction fit to limit further movement of the second leg portion 154 relative to the first leg portion 152 once the second leg portion 154 is adjusted to the desired position.

A foot 160 is attached to the second leg portion 156, and specifically to the proximal portion 157 thereof. The foot 160 may be configured for 360° rotation about a point of rotation 159 at the second leg proximal portion 157. Several exemplary arrangements of the foot 160 are illustrated in FIG. 7, although other arrangements are also possible. In an embodiment, the foot 160 may act as a gripping element, allowing the case 100 to be secured to a receiving surface, such as an air vent in a vehicle, and each foot 160 of each leg 150 may be specifically positioned for such use. The foot 160 may also be referred to as a third leg portion of the leg assembly.

When the legs 150 are not in use, the first leg portion 152 is situated in the retracted configuration, and the second leg portion 156 is positioned in a storage configuration. In the storage configuration, the second leg portion 156 is pivoted downward toward the back panel 110 (represented by the arrow in FIG. 2) such that the second leg portion 156 is substantially in the same horizontal plane as the first leg portion 152, and extends substantially perpendicularly outwardly away from the first leg portion 152. The second leg portion 156 is received into the channel 132 or 134 as illustrated in FIG. 1.

Likewise, the foot 160 is rotated such that, when the second leg portion 156 is received into the respective channel 132 or 134, the foot 160 is received into the respective recessed access point 140 or 142. When the foot 160 is in the storage configuration, a space 143 is defined between the angled wall 144 and an end of the foot 160. In the storage configuration, the second leg portion 156 and the foot 160 is substantially flush with the outer surface 120.

To use the legs 150, a user inserts his or her finger into the space 143 between the foot 160 and the angled wall 144. The user dislodges the foot 160 from within the access point 140, and moves the leg 150 into the use configuration. In the use configuration, the second leg portion 156 is pivoted upwardly via the pivotal linkage 155 from the storage configuration as illustrated by the arrow in FIG. 2. The user may then position the legs 150 individually into the desired position as described above.

It is understood that while certain forms of this invention have been illustrated and described, it is not limited thereto except insofar as such limitations are included in the following claims and allowable functional equivalents thereof.

The invention claimed is:

1. A case for supporting a mobile communication device, comprising:
   a casing having a plurality of walls arranged to define an interior space for protecting the mobile communication device positioned inside said interior space, wherein one of said plurality of walls is a back portion having an outer surface and defining an interior area beneath said outer surface;
   wherein said back portion defines a first channel in communication with said interior area and extending between opposed side edges of said back panel, a pair of first grooves in communication with said first channel, and a pair of second grooves in communication with said pair of first grooves, respectively;

a pair of first leg assemblies, each first leg assembly including:
  a first leg portion slidably received into opposed ends of said first channel, respectively;
  a second leg portion coupled to said first leg portion and removably received in said first groove; and
  a third leg portion coupled to said second portion and removably received in said second groove;
  wherein each respective second leg portion is pivotally coupled to a respective first leg portion with a ball joint for operable movement of said respective second leg portion relative to said respective first leg portion.

2. The case of claim 1, wherein said first leg portion is selectively movable between a retracted configuration wherein said first leg portion is substantially entirely within said first channel, and a deployed configuration wherein said first leg portion extends away from said first channel.

3. The case of claim 2, wherein said second leg portion comprises a proximal portion in telescopic communication with a distal portion, and wherein said second leg portion is selectively movable between a retracted configuration wherein said distal portion is telescopically received into said proximal portion, and a deployed configuration wherein said distal portion is telescopically extended from said proximal portion.

4. The case of claim 1, wherein said first leg portion comprises a proximal portion in telescopic communication with a distal portion.

5. The case of claim 4, wherein:
said first leg portion is selectively movable between a retracted configuration and a deployed configuration:
in said retracted configuration, said first leg distal portion is telescopically received into said first leg proximal portion, and said first leg distal portion is substantially entirely within said first channel;
said deployed configuration comprises a partially deployed configuration and a fully deployed configuration, wherein:
  in said partially deployed configuration, said first leg distal portion is telescopically received into said first leg proximal portion, and said first leg proximal portion extends away from said first channel; and
  in said fully deployed configuration, said first leg distal portion is telescopically extended from said first leg proximal portion, and said first leg proximal portion extends away from said first channel.

6. The case of claim 5, wherein said second leg portion comprises a proximal portion in telescopic communication with a distal portion.

7. The case of claim 6, wherein said second leg portion is selectively movable between a retracted configuration and a deployed configuration, wherein:
in said retracted configuration, said second leg distal portion is telescopically received into said second leg proximal portion; and
in said deployed configuration, said second leg distal portion is telescopically extended from said second leg proximal portion.

8. The case of claim 1, wherein said third leg portion is rotatable 360° about a point of rotation of said second leg portion.

9. The case of claim 1, wherein said back portion further defines a second channel spatially separated from said first channel, said second channel being in communication with said interior area and extending between said opposed side edges of said back panel, wherein said pair of first grooves extends between said first channel and said second channel; and wherein said case further comprises a pair of second leg assemblies, each second leg assembly including:
  a first leg portion slidably received into opposed ends of said second channel, respectively;
  a second leg portion coupled to said first leg portion and removably received into said first groove; and
  a third leg portion coupled to said second leg portion and removably received in said second groove;
  wherein each respective second leg portion is pivotally coupled to a respective first leg portion with a ball joint for operable movement of said respective second leg portion relative to said second leg portion.

10. The case of claim 9, wherein:
each of said first leg portions is selectively movable between a retracted configuration and a deployed configuration;
in said retracted configuration, each first leg portion of said pair of first leg assemblies is substantially entirely within said first channel, and each first leg portion of said pair of second leg assemblies is entirely within said second channel; and
in said deployed configuration, each first leg portion of said pair of first leg assemblies extends away from said first channel, and each first leg portion of said pair of second leg assemblies extends away from said second channel.

11. The case of claim 10, wherein each of said second leg portions comprises a proximal portion in telescopic communication with a distal portion, and wherein said second leg portion is selectively movable between a retracted configuration wherein said distal portion is telescopically received into said proximal portion, and a deployed configuration wherein said distal portion is telescopically extended from said proximal portion.

12. The case of claim 11, wherein said third leg portion is rotatable 360° about a point of rotation of said second leg portion.

13. A case for supporting a mobile communication device, comprising:
a casing having a back panel and a plurality of walls extending from said back panel to define an interior space for receiving said mobile communication device, wherein said casing further comprises:
  a first channel defined into said back panel;
  a second channel defined into said back panel, said second channel being spatially separated from said first channel;
  a first groove extending between said first and second channels at a first side of said casing;
  a second groove extending between said first and second channels at a second side of said casing;
  a first access groove extending from said first groove toward said second groove; and
  a second access groove extending from said second groove toward said first groove;
a pair of first leg assemblies, and a pair of second leg assemblies, each leg assembly comprising:
  a first leg portion;
  a second leg portion pivotally coupled to said first leg portion; and
  a third leg portion rotatably coupled to said second leg portion;
wherein:
  each first leg portion of said pair of first leg assemblies is slidably received into opposed ends of said first channel, respectively;

each first leg portion of said pair of second leg assemblies is slidably received into opposed ends of said second channel, respectively;

each second leg portion of said pair of first leg assemblies is removably received in said first groove;

each second leg portion of said pair of second leg assemblies is removably received in said second groove;

one of said third leg portions of said pair of first leg assemblies and one of said third leg portions of said pair of second leg assemblies is removably received in said first access groove; and one of said third leg portions of said pair of first leg assemblies and one of said third leg portions of said pair of second leg assemblies is removably received in said second access groove.

14. The case of claim 13, wherein each of said first leg portions is selectively movable between a retracted configuration wherein said first leg portion is substantially entirely within said respective first or second channel, and a partially deployed configuration wherein said first leg portion extends away from said respective first or second channel.

15. The case of claim 14, wherein each of said second leg portions comprises a proximal portion in telescopic communication with a distal portion, and wherein said second leg portion is selectively movable between a retracted configuration wherein said distal portion is telescopically received into said proximal portion, and a deployed configuration wherein said distal portion is telescopically extended from said proximal portion.

16. The case of claim 13, wherein each of said second leg portions comprises a proximal portion in telescopic communication with a distal portion, and wherein said second leg portion is selectively movable between a retracted configuration wherein said distal portion is telescopically received into said proximal portion, and a deployed configuration wherein said distal portion is telescopically extended from said proximal portion.

17. The case of claim 16, wherein:
each of said first leg portions comprises a proximal portion in telescopic communication with a distal portion; and
said first leg portion is selectively movable between a retracted configuration and a deployed configuration, wherein:
in said retracted configuration, said first leg distal portion is telescopically received into said first leg proximal portion, and said first leg distal portion is substantially entirely within said respective first or second channel;
said deployed configuration comprises a partially deployed configuration and a fully deployed configuration, wherein:
in said partially deployed configuration, said first leg distal portion is telescopically received into said first leg proximal portion, and said first leg proximal portion extends away from said respective first or second channel; and
in said fully deployed configuration, said first leg distal portion is telescopically extended from said first leg proximal portion, and said first leg proximal portion extends away from said respective first and second channel.

18. A case for a mobile communication device, comprising:
a housing, comprising:
a channel defined laterally in a backside of said housing, said channel having opposed open channel ends;
a pair of recessed grooves extending longitudinally from the channel, one of said recessed grooves being inwardly laterally offset from one of said opposed open channel ends, and the other of said recessed grooves being inwardly laterally offset from the other of said opposed open channel ends;
a pair of leg assemblies, each leg assembly including:
a first leg portion slidably received into said opposed ends of said channel, respectively; and
a second leg portion pivotally coupled to said first leg portion and removably received in a respective recessed groove.

19. The case of claim 18, wherein each respective second leg portion is pivotally coupled to a respective first leg portion with a ball joint for operable movement of said respective second leg portion relative to said respective first leg portion.

20. The case of claim 19, wherein:
said housing further comprises a pair of access grooves, one access groove extending perpendicularly inwardly from each recessed groove;
said leg assembly further comprises a third leg portion rotatably connected to said second leg portion, said third leg portion being removably received in a respective access groove.

* * * * *